(12) United States Patent
Summers

(10) Patent No.: US 11,364,964 B2
(45) Date of Patent: Jun. 21, 2022

(54) MOTORCYCLE ACCESSORY MOUNTING SYSTEM

(71) Applicant: Darwin Summers, Elk Grove, CA (US)

(72) Inventor: Darwin Summers, Elk Grove, CA (US)

( * ) Notice: Subject to any disclaimer, the term of this patent is extended or adjusted under 35 U.S.C. 154(b) by 170 days.

(21) Appl. No.: 16/929,943

(22) Filed: Jul. 15, 2020

(65) Prior Publication Data

US 2022/0017172 A1    Jan. 20, 2022

(51) Int. Cl.
  *B62J 9/21*    (2020.01)
  *B62D 11/00*   (2006.01)
  *B62J 9/30*    (2020.01)
  *B62J 9/27*    (2020.01)

(52) U.S. Cl.
  CPC ............... *B62J 9/21* (2020.02); *B62D 11/00* (2013.01); *B62J 9/27* (2020.02); *B62J 9/30* (2020.02)

(58) Field of Classification Search
  CPC ......... B62J 9/27; B62J 9/30; B62J 9/21; B62J 9/23; B62J 11/04; B62J 50/225; B62J 9/28; B62D 11/00; F16C 11/06; F16M 13/022
  USPC ....... 224/442, 420, 421, 926, 413, 414, 607, 224/600
  See application file for complete search history.

(56) References Cited

U.S. PATENT DOCUMENTS

| | | | |
|---|---|---|---|
| 4,312,465 A * | 1/1982 | Sinkhorn | B62J 11/04 224/440 |
| 5,423,509 A | 6/1995 | LaPorte | |
| 5,758,513 A * | 6/1998 | Smith | F25D 3/08 62/530 |
| 5,881,936 A | 3/1999 | Li | |
| 6,543,637 B1 * | 4/2003 | Osborn | A47G 23/0216 220/737 |
| 6,783,040 B2 | 8/2004 | Batchelor | |
| 6,942,131 B2 * | 9/2005 | Trautman | B62J 11/04 224/547 |
| D567,740 S | 4/2008 | Smith | |
| 8,757,460 B1 * | 6/2014 | Barnes | B62J 11/00 224/443 |
| 9,682,738 B1 | 6/2017 | Silva | |
| 10,653,255 B1 * | 5/2020 | Trawinski | B65D 50/064 |
| 2010/0170925 A1 | 7/2010 | Osten | |

FOREIGN PATENT DOCUMENTS

| | | | |
|---|---|---|---|
| WO | WO2010078585 | 7/2010 | |
| WO | WO-2012014139 A1 * | 2/2012 | B62J 11/00 |

* cited by examiner

*Primary Examiner* — Nathan J Newhouse
*Assistant Examiner* — Matthew T Theis

(57) ABSTRACT

A motorcycle accessory mounting system for conveniently riding with beverages and a cellphone includes a cellphone mount apparatus and a beverage mount apparatus. The cellphone mount apparatus comprises a cellphone clamp to selectively engage a handlebar of a motorcycle. A cellphone holder back is coupled to a cellphone rod. A pair of cellphone holder sides is coupled to the cellphone holder back and to selectively engage a cellphone. The beverage mount apparatus comprises a beverage clamp to selectively engage the handlebar. A beverage holder is coupled to a beverage rod and has a cup bottom, a cup sidewall coupled to the cup bottom, and an open cup top side. The beverage holder serves as a cup holder to receive a cup conforming to the cup sidewall. A lid and a straw are engageable with the open cup top side.

10 Claims, 7 Drawing Sheets

MOTORCYCLE ACCESSORY MOUNTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to motorcycle accessory devices and more particularly pertains to a new motorcycle accessory device for conveniently riding with beverages and a cellphone.

(2) Description of Related Art Including Information Disclosed Under 37 CFR 1.97 and 1.98

The prior art relates to motorcycle accessory devices. Existing devices may serve as clamps with cupholders but do not additionally serve as a cup with a fitted lid and straw. These devices also lack a separate element to store and cool additional beverages, as well as an additional element to secure a cellphone.

BRIEF SUMMARY OF THE INVENTION

An embodiment of the disclosure meets the needs presented above by generally comprising a cellphone mount apparatus and a beverage mount apparatus. The cellphone mount apparatus comprises a cellphone clamp configured to selectively engage a handlebar of a motorcycle and a cellphone rod coupled to the cellphone clamp. A cellphone holder back is coupled to the cellphone rod. A pair of cellphone holder sides is coupled to the cellphone holder back and is configured to selectively engage a cellphone. The beverage mount apparatus comprises a beverage clamp configured to selectively engage the handlebar of the motorcycle and a beverage rod coupled to the beverage clamp. A beverage holder is coupled to the beverage rod and has a cup bottom, a cup sidewall coupled to the cup bottom, and an open cup top side. The beverage holder serves as a cup holder to receive a cup conforming to the cup sidewall. A lid is selectively engageable with the open cup top side. A straw is slidably engageable through a straw aperture of the lid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
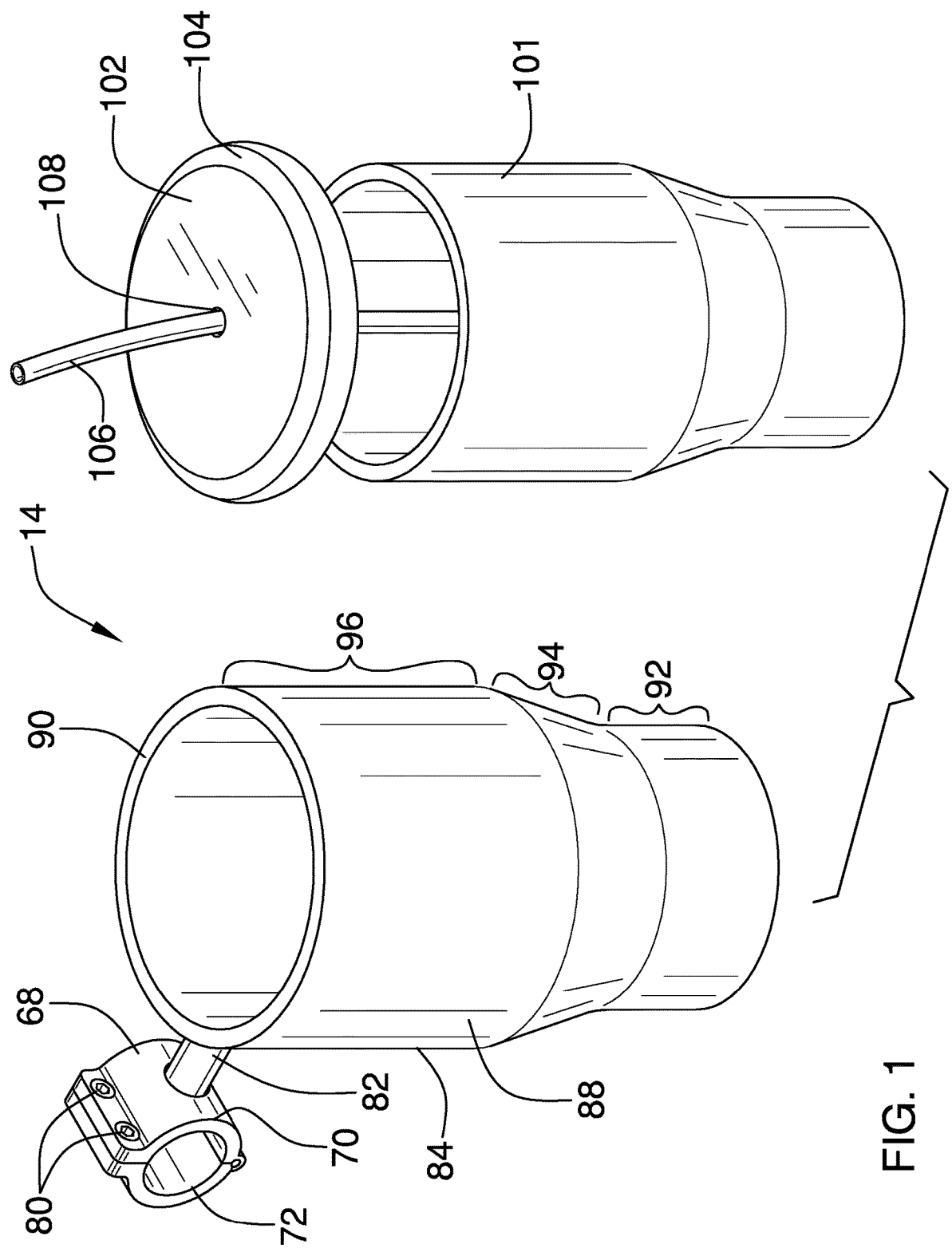
FIG. 1 is an isometric view of a motorcycle accessory mounting system according to an embodiment of the disclosure.
Figure 2:
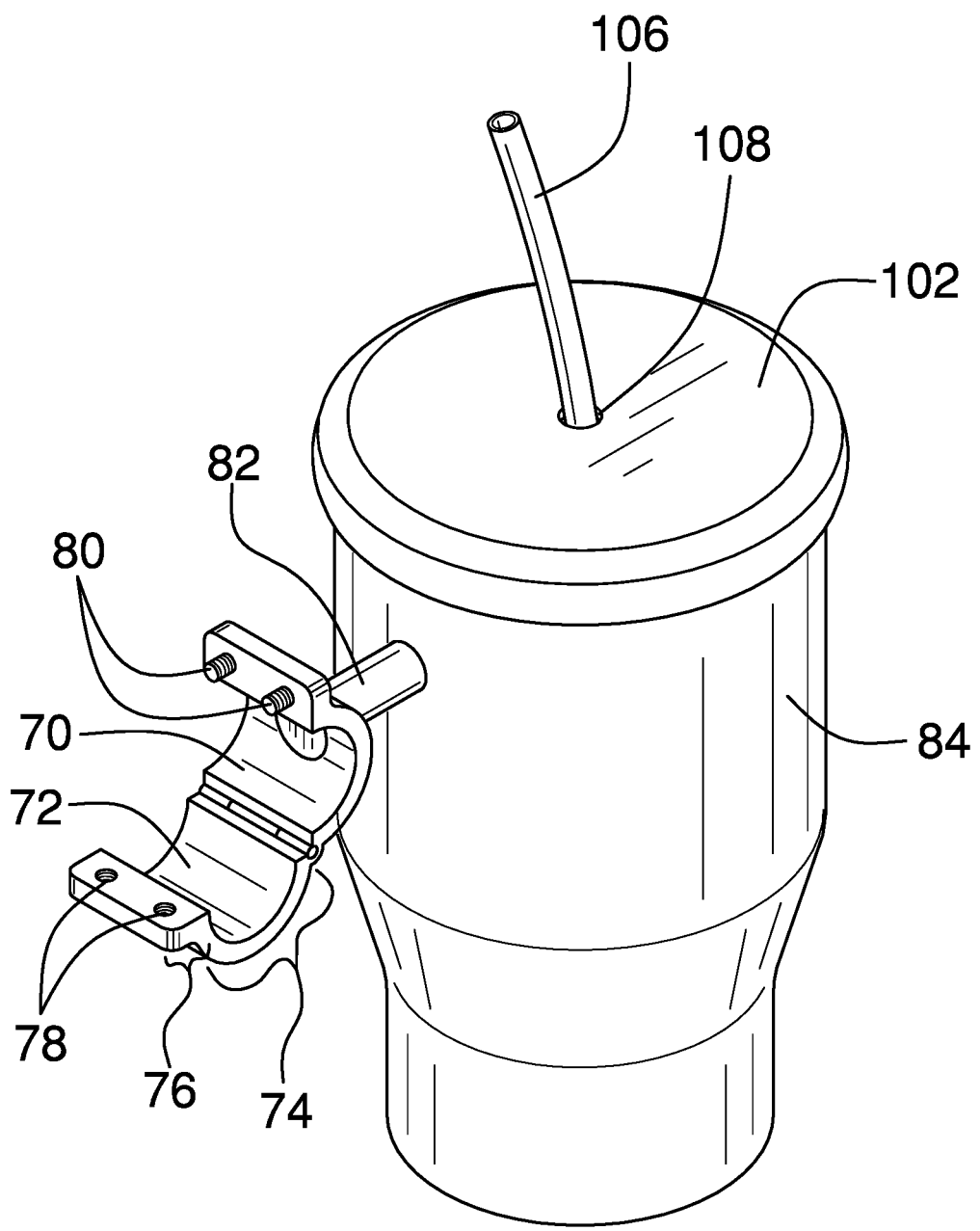
FIG. 2 is an isometric view of an embodiment of the disclosure.
Figure 3:
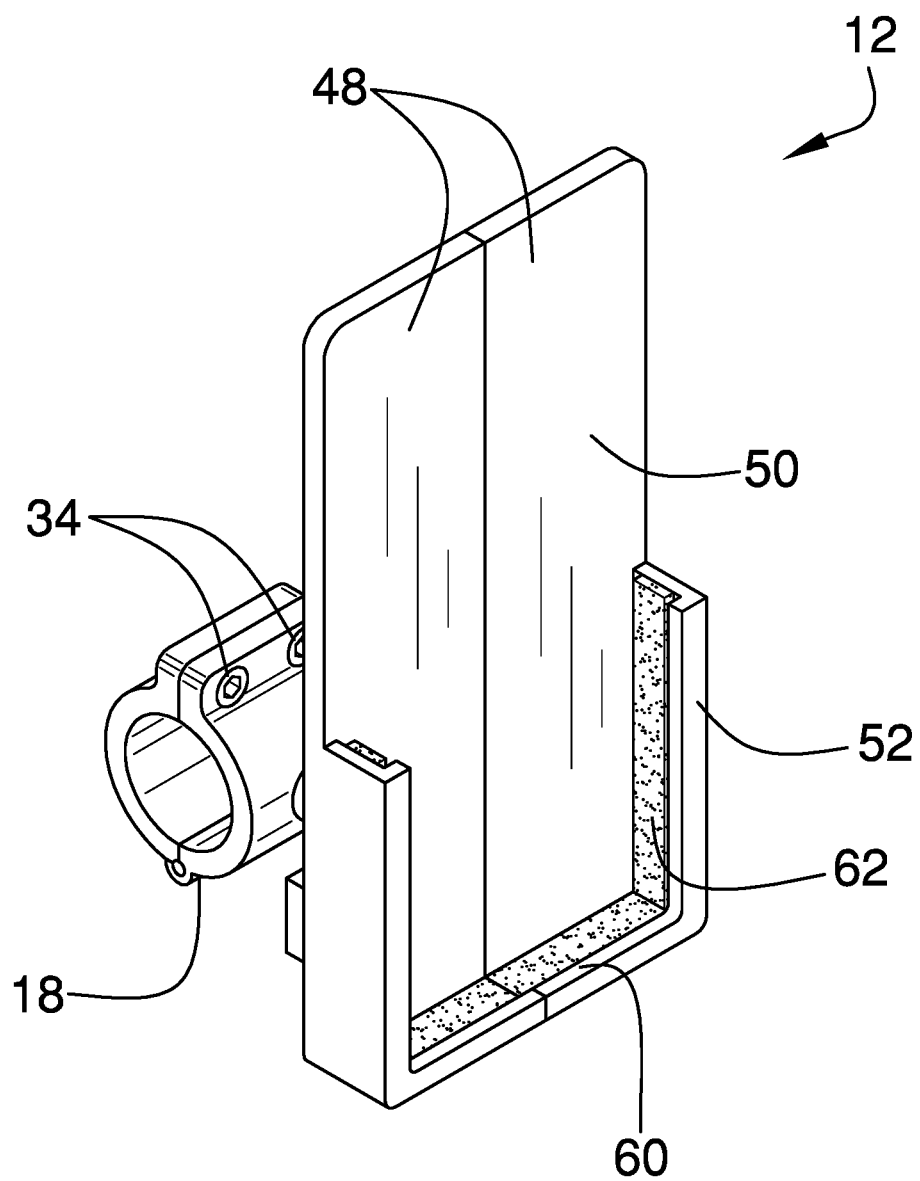
FIG. 3 is an isometric view of an embodiment of the disclosure.
Figure 4:
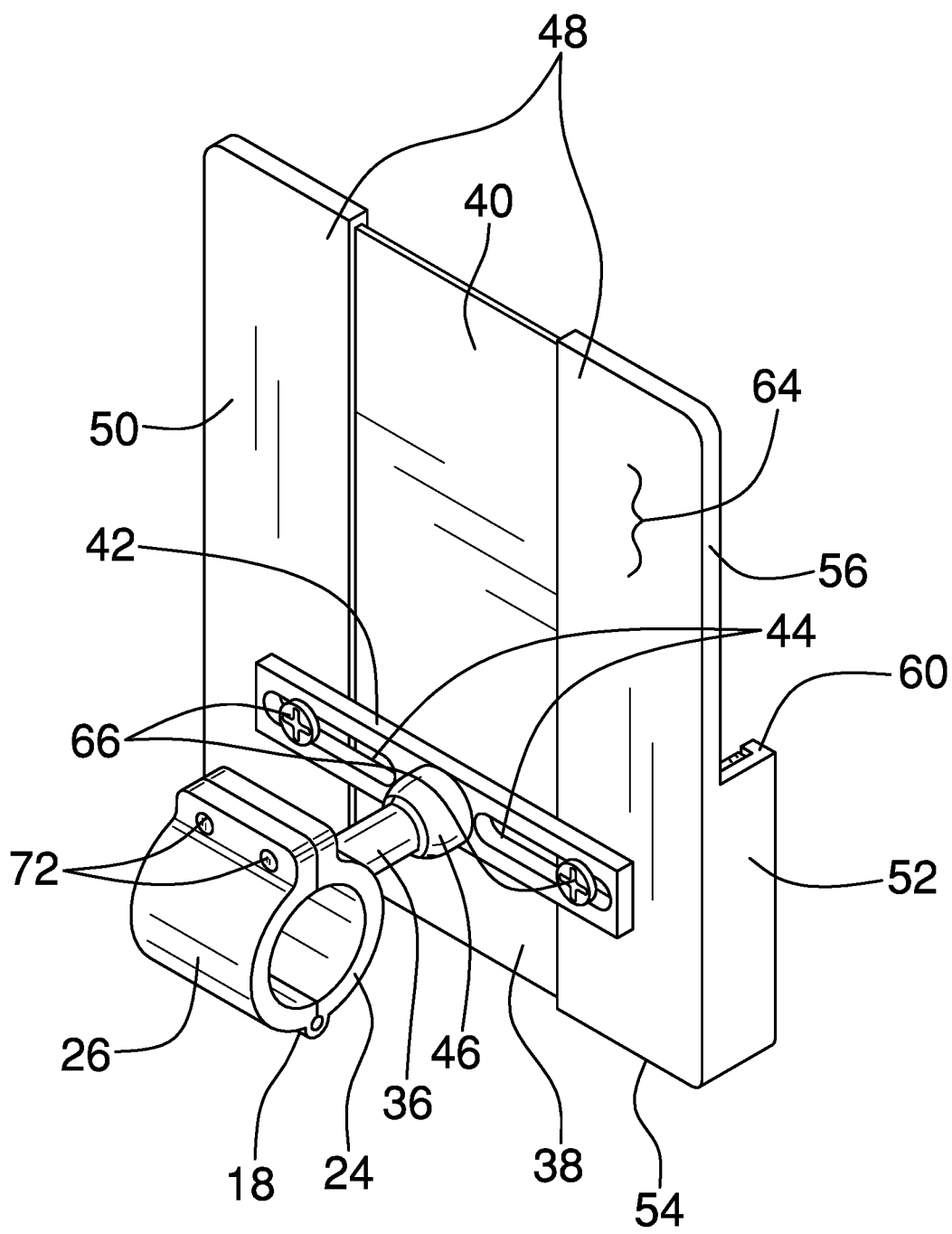
FIG. 4 is an isometric view of an embodiment of the disclosure.
Figure 5:
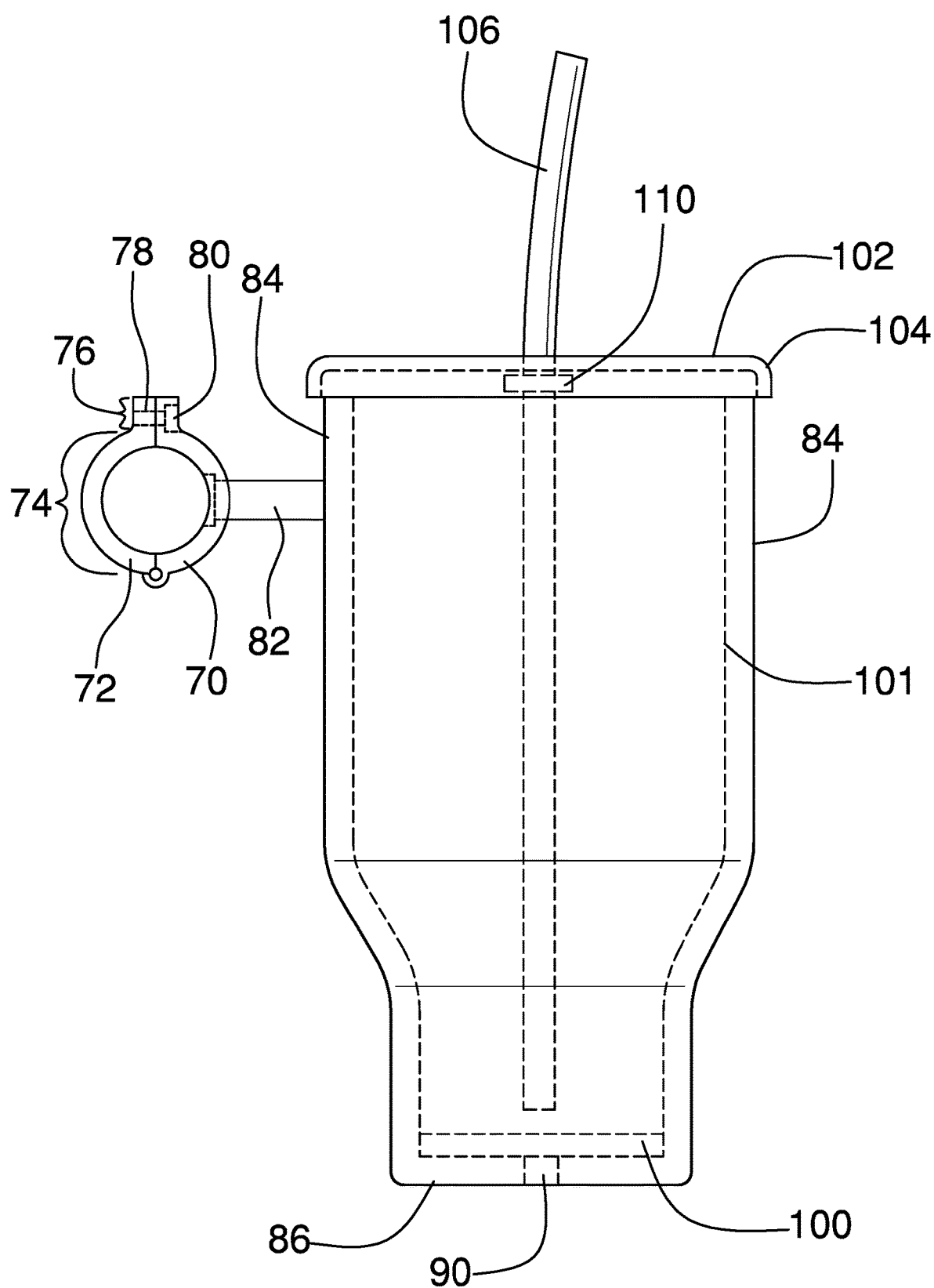
FIG. 5 is a side elevation view of an embodiment of the disclosure.
Figure 6:
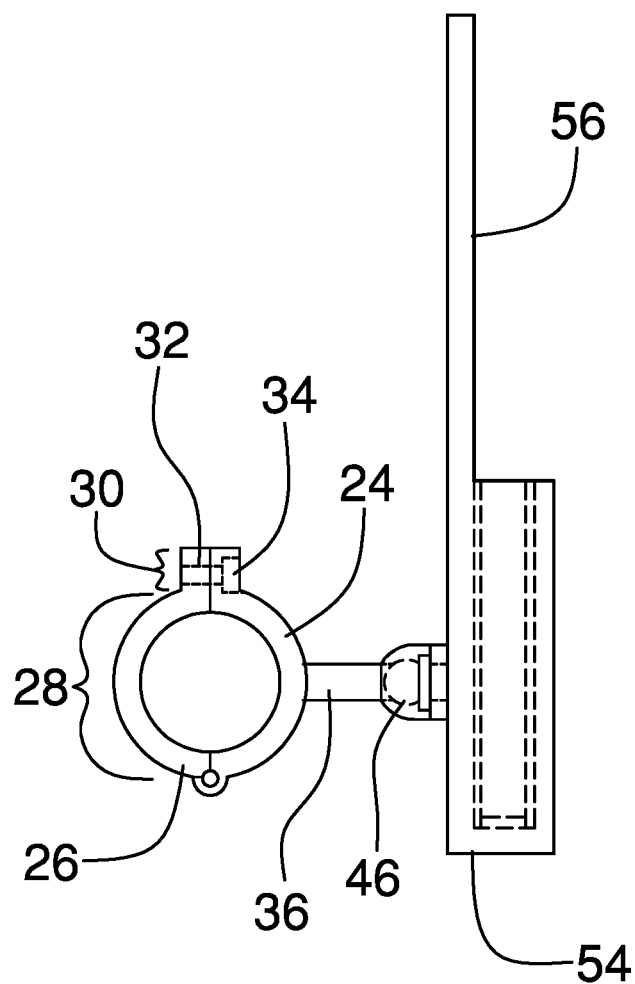
FIG. 6 is a side elevation view of an embodiment of the disclosure.
Figure 7:
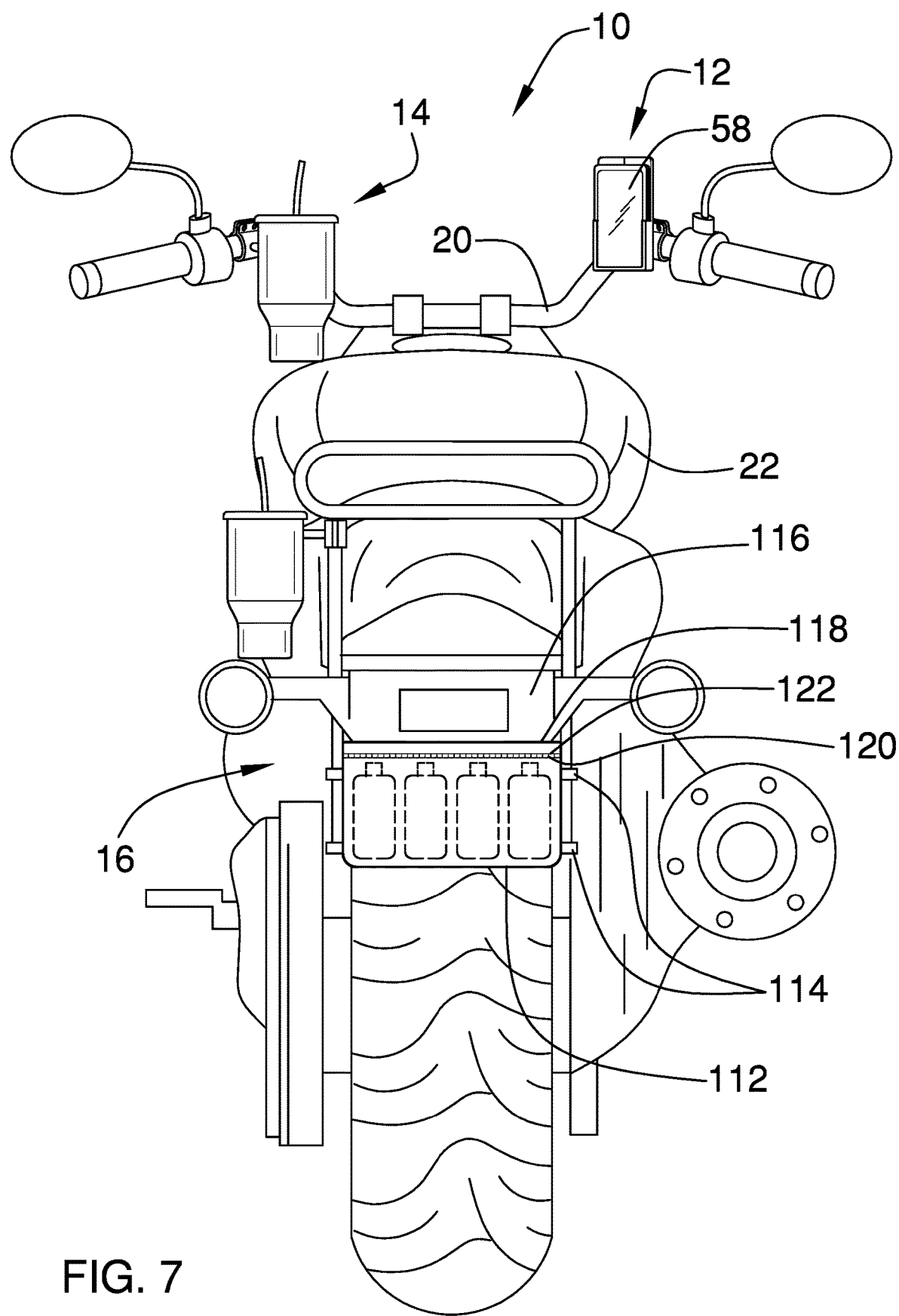
FIG. 7 is an in-use view of an embodiment of the disclosure.

With reference now to the drawings, and in particular to FIGS. 1 through 7 thereof, a new motorcycle accessory device embodying the principles and concepts of an embodiment of the disclosure and generally designated by the reference numeral 10 will be described.

As best illustrated in FIGS. 1 through 7, the motorcycle accessory mounting system 10 generally comprises a cellphone mount apparatus 12, a beverage mount apparatus 14, and a beverage cooler apparatus 16. The cellphone mount apparatus 12 comprises a cellphone clamp 18 configured to selectively engage a handlebar 20 of a motorcycle 22. The cellphone clamp 18 may have a cellphone clamp first half 24 hingingly coupled to a cellphone clamp second half 26. Each of the cellphone clamp first half 24 and the cellphone clamp second half 26 has a cellphone hemicylindrical portion 28 and a planar cellphone engagement portion 30. Each cellphone engagement portion 30 has a pair of cellphone engagement apertures 32 to receive a pair of cellphone bolts 34. The cellphone engagement apertures 32 of the cellphone clamp first half 24 may be through holes and the cellphone engagement apertures 32 of the cellphone clamp second half 26 may be threaded.

A cellphone rod 36 is coupled to the cellphone clamp 18. The cellphone rod 36 may be rotatably coupled to the cellphone hemicylindrical portion 28 of the cellphone clamp first half 24. A cellphone holder back 38 is coupled to the cellphone rod 36. The cellphone holder back 38 may have a panel portion 40 and an expansion bar portion 42. The expansion bar portion 42 has a pair of obround locking apertures 44 extending therethrough and the expansion bar portion 42 has a cellphone ball joint 46 coupled to the cellphone rod 36.

A pair of cellphone holder sides 48 is coupled to the cellphone holder back 38. Each of the pair of cellphone holder sides 48 has a hollow back portion 50 slidably receiving the panel portion 40 of the cellphone back and a support portion 52 perpendicularly extending from a bottom edge 54 and an outer edge 56 of the back portion 50. The pair of cellphone holder sides 48 is configured to selectively engage a cellphone 58. The support portion 52 may have a return lip 60 and a padded layer 62 extending from the back portion 50 to the return lip 60 to protect and better secure the cellphone 58. A back face 64 of the back portion slides between the panel portion 40 and the expansion bar portion 42. A pair of locking screws 66 selectively engages the back portion 50 through the pair of locking apertures 44 to prevent and allow movement of the pair of cellphone holder sides 48.

The beverage mount apparatus 14 comprises a beverage clamp 68 configured to selectively engage the handlebar 20 of the motorcycle. The beverage clamp 68 has a beverage clamp first half 70 hingingly coupled to a beverage clamp second half 72. Each of the beverage clamp first half 70 and the beverage clamp second half 72 may have a beverage hemicylindrical portion 74 and a planar beverage engagement portion 76. Each beverage engagement portion 76 has a pair of beverage engagement apertures 78 to receive a pair of beverage bolts 80. The beverage engagement apertures 78 of the beverage clamp first half 24 may be through holes and the beverage engagement apertures 78 of the beverage clamp second half 72 may be threaded.

A beverage rod 82 is coupled the beverage clamp 68. The beverage rod 82 may be rotatably coupled to the beverage hemicylindrical portion 74 of the beverage clamp first half. A beverage holder 84 is coupled to the beverage rod 82. The beverage holder 84 has a cup bottom 86, a cup sidewall 88 coupled to the cup bottom 84, and an open cup top side 90. The cup sidewall 88 may have a lower cylindrical portion 92, a medial tapered portion 94, and an upper cylindrical portion 96. The diameter of the upper cylindrical portion 96 is greater than the diameter of the lower cylindrical portion 92. The cup bottom 86 may have a drainage aperture 98 extending therethrough. The beverage holder 84 has a removable stopper pad 100 conforming to the cup bottom 86 to selectively seal or unseal the drainage aperture 98. The beverage holder 84 serves as a cup holder to receive a cup 101 conforming to the cup sidewall 88. The cup 101 may lock into the beverage holder 84 with a quarter-turn thread or similar twistable locking mechanism, with the stopper pad 100 adding compression to keep the cup 101 engaged.

A lid 102 is coupled to the beverage holder 84 and is selectively engageable with the open cup top side 90. The lid 102 may have a rounded upper perimeter 104 for user comfort in case of accidental contact with a hand or face while riding. A straw 106 is coupled to the lid 102. The straw 106 is slidably engageable through a straw aperture 108 of the lid. The straw 106 may have a stopper ring 110 to prevent the straw 106 from sliding out of the straw aperture 108.

The beverage cooler apparatus 16 comprises a cooler body 112. A plurality of mounting straps 114 is coupled to the cooler body 112 and configured to selectively engage a rear end 116 of the motorcycle. The cooler body 112 may be insulated. A cooler top 118 is coupled to the cooler body 112 to selectively seal and unseal an open cooler body top side 120 to add or remove beverages. The cooler body 112 and cooler top 118 may have a zipper 122.

In use, the cellphone clamp 18 and the beverage clamp 68 are engaged with the handlebar 20 of the motorcycle and the mounting straps 114 of the beverage cooler apparatus are coupled to the rear end 116. A cellphone is then engaged between the pair of cellphone holder sides 48 and the pair of locking screws 66 is tightened to secure the cellphone in place. The beverage holder 84 is then used either as a cupholder or as a vessel for a beverage while riding.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorcycle accessory mounting system comprising:
   a cellphone mount apparatus comprising:
      a cellphone clamp configured to selectively engage a handlebar of a motorcycle;
      a cellphone rod coupled to the cellphone clamp;
      a cellphone holder back coupled to the cellphone rod; and
      a pair of cellphone holder sides coupled to the cellphone holder back, the pair of cellphone holder sides being configured to selectively engage a cellphone;
   a beverage mount apparatus comprising:
      a beverage clamp configured to selectively engage the handlebar of the motorcycle;
      a beverage rod coupled the beverage clamp;
      a beverage holder coupled to the beverage rod, the beverage holder having a cup bottom, a cup sidewall coupled to the cup bottom, and an open cup top side, the beverage holder serving as a cup holder to receive a cup conforming to the cup sidewall;
      a lid coupled to the beverage holder, the lid being selectively engageable with the open cup top side; and
      a straw coupled to the lid, the straw being slidably engageable through a straw aperture of the lid; and
   the cellphone holder back having a panel portion and an expansion bar portion, the expansion bar portion having a pair of obround locking apertures extending therethrough, each of the pair of cellphone holder sides having a hollow back portion slidably receiving the panel portion of the cellphone back and a support portion perpendicularly extending from a bottom edge and an outer edge of the back portion, a back face of the back portion sliding between the panel portion and the expansion bar portion, a pair of locking screws selectively engaging the back portion through the pair of locking apertures to prevent and allow movement of the pair of cellphone holder sides.

2. The motorcycle accessory mounting system of claim 1 further comprising a beverage cooler apparatus comprising:
   a cooler body;
   a plurality of mounting straps coupled to the cooler body, the plurality of mounting straps being configured to selectively engage a rear end of the motorcycle; and
   a cooler top coupled to the cooler body, the cooler top selectively sealing and unsealing an open cooler body top side to add or remove beverages.

3. The motorcycle accessory mounting system of claim 1 further comprising the beverage clamp having a beverage clamp first half hingingly coupled to a beverage clamp second half, each of the beverage clamp first half and the beverage clamp second half having a beverage hemicylindrical portion and a planar beverage engagement portion, each beverage engagement portion having a pair of beverage engagement apertures to receive a pair of beverage bolts, the beverage rod being rotatably coupled to the beverage hemicylindrical portion of the beverage clamp first half; the cellphone clamp having a cellphone clamp first half hingingly coupled to a cellphone clamp second half, each of the cellphone clamp first half and the cellphone clamp second half having a cellphone hemicylindrical portion and a planar cellphone engagement portion, each cellphone engagement portion having a pair of cellphone engagement apertures to receive a pair of cellphone bolts, the cellphone rod being rotatably coupled to the cellphone hemicylindrical portion of the cellphone clamp first half.

4. The motorcycle accessory mounting system of claim 1 further comprising the cellphone holder back having a cellphone ball joint coupled to the cellphone rod.

5. The motorcycle accessory mounting system of claim 1 further comprising the cup sidewall of the beverage holder having a lower cylindrical portion, a medial tapered portion, and an upper cylindrical portion, the diameter of the upper cylindrical portion being greater than the diameter of the lower cylindrical portion.

6. The motorcycle accessory mounting system of claim 1 further comprising the cup bottom having a drainage aperture extending therethrough, the beverage holder having a removable stopper pad conforming to the cup bottom to selectively seal or unseal the drainage aperture.

7. The motorcycle accessory mounting system of claim 1 further comprising the lid having a rounded upper perimeter.

8. The motorcycle accessory mounting system of claim 1 further comprising the straw having a stopper ring, the stopper ring preventing the straw from sliding out of the straw aperture.

9. The motorcycle accessory mounting system of claim 1 further comprising the support portion having a return lip and a padded layer extending from the back portion to the return lip.

10. A motorcycle accessory mounting system comprising:
    a cellphone mount apparatus comprising:
      a cellphone clamp configured to selectively engage a handlebar of a motorcycle, the cellphone clamp having a cellphone clamp first half hingingly coupled to a cellphone clamp second half, each of the cellphone clamp first half and the cellphone clamp second half having a cellphone hemicylindrical portion and a planar cellphone engagement portion, each cellphone engagement portion having a pair of cellphone engagement apertures to receive a pair of cellphone bolts;
      a cellphone rod coupled to the cellphone clamp, the cellphone rod being rotatably coupled to the cellphone hemicylindrical portion of the cellphone clamp first half;
      a cellphone holder back coupled to the cellphone rod, the cellphone holder back having a panel portion and an expansion bar portion, the expansion bar portion having a pair of obround locking apertures extending therethrough, the expansion bar portion having a cellphone ball joint coupled to the cellphone rod; and
      a pair of cellphone holder sides coupled to the cellphone holder back, each of the pair of cellphone holder sides having a hollow back portion slidably receiving the panel portion of the cellphone back and a support portion perpendicularly extending from a bottom edge and an outer edge of the back portion, the support portion having a return lip and a padded layer extending from the back portion to the return lip, a back face of the back portion sliding between the panel portion and the expansion bar portion, a pair of locking screws selectively engaging the back portion through the pair of locking apertures to prevent and allow movement of the pair of cellphone holder sides, the pair of cellphone holder sides being configured to selectively engage a cellphone;
    a beverage mount apparatus comprising:
      a beverage clamp configured to selectively engage the handlebar of the motorcycle, the beverage clamp having a beverage clamp first half hingingly coupled to a beverage clamp second half, each of the beverage clamp first half and the beverage clamp second half having a beverage hemicylindrical portion and a planar beverage engagement portion, each beverage engagement portion having a pair of beverage engagement apertures to receive a pair of beverage bolts;
      a beverage rod coupled the beverage clamp, the beverage rod being rotatably coupled to the beverage hemicylindrical portion of the beverage clamp first half;
      a beverage holder coupled to the beverage rod, the beverage holder having a cup bottom, a cup sidewall coupled to the cup bottom, and an open cup top side, the cup sidewall of the beverage holder having a lower cylindrical portion, a medial tapered portion, and an upper cylindrical portion, the diameter of the upper cylindrical portion being greater than the diameter of the lower cylindrical portion, the cup bottom having a drainage aperture extending therethrough, the beverage holder having a removable stopper pad conforming to the cup bottom to selectively seal or unseal the drainage aperture, the beverage holder serving as a cup holder to receive a cup conforming to the cup sidewall;
      a lid coupled to the beverage holder, the lid being selectively engageable with the open cup top side, the lid having a rounded upper perimeter; and
      a straw coupled to the lid, the straw being slidably engageable through a straw aperture of the lid, the straw having a stopper ring, the stopper ring preventing the straw from sliding out of the straw aperture; and
    a beverage cooler apparatus comprising:

a cooler body;
a plurality of mounting straps coupled to the cooler body, the plurality of mounting straps being configured to selectively engage a rear end of the motorcycle; and
a cooler top coupled to the cooler body, the cooler top selectively sealing and unsealing an open cooler body top side to add or remove beverages.

\* \* \* \* \*